UNITED STATES PATENT OFFICE.

REX DE ORE McDILL, OF TAMPA, FLORIDA.

FOOD PRODUCT AND PROCESS OF MAKING SAME.

1,365,001. Specification of Letters Patent. Patented Jan. 11, 1921.

No Drawing. Application filed December 13, 1919. Serial No. 344,525.

*To all whom it may concern:*

Be it known that I, REX DE ORE McDILL, a citizen of the United States, and a resident of Tampa, in the county of Hillsborough and State of Florida, have invented a new and useful Food Product and Process of Making Same, of which the following is a specification.

This invention is an improvement in food products and in the process of producing the same, and relates to products preserved in the dry state for making into marmalades, jams, jellies, etc., by the simple addition of sugar and water when cooking and utilizes the components of the fruit, or fruits, in combination with other fruits, to bring about a proper balance of the acid, pectin and flavor in the finished product.

In the specification and claims set forth hereinafter, wherever pectin of the orange is specified, it is to be understood that pectin of the apple will apply as well and is comprehended.

A feature of my invention is the preparation of a pomace in a dry state from fruits to be used in making marmalades, jams and jellies, so that all that is required to make the jam or jelly is to cook and soak the pomace, strain off the juice and cook the resultant juice with sugar in the manufacture of jelly. In the manufacture of jam and marmalade the operation is the same as that of the jelly making, except that the pomace itself is incorporated into the jam or marmalade when cooked with the sugar as in the standard practice of making such marmalades and jams from fresh fruits.

The primary object of the invention is to provide for the utilization by the housewife for jelly, jam and marmalade making, of fruits which she is unable to obtain in the fresh state, as well as tropical and subtropical fruits which are not available on account of the lack of keeping qualities necessary for transportation. Dried fruit has been used by the house-wife and others for the making of jelly, jams and marmalades, but it has been necessary in these cases for her to add acids or pectin to these fruits when they are cooked, with doubtful results, in order to make a complete jelly.

Another object of the invention is to provide an article which contains in the dried form, all of the elements required for making jelly of the particular flavor desired, so that it is unnecessary for any other ingredients to be added when cooked except the sugar and water. Somewhat similar substances have been made, but these call for the actual extraction of the pectin from the fruit or vegetable, and extraction of the tartaric or citric acid from the fruit or vegetable and combining such pectin and acid with a sugar and flavor.

My invention differs from these in that the fruit itself is dehydrated between the temperatures of 112 and 156 degrees Fahrenheit, depending upon the kind of fruit, with the object of preserving these jelly making elements namely pectin and acid contents in the fruit, it being demonstrated that a more palatable product can be obtained in this manner than by using the actual pectin which has been extracted from the fruit. Likewise a pure fruit juice adds more palatability than the plain addition of an acid. Some fruits contain all of the essential elements for making a jelly, that is acid and pectin in the proper proportion. Other fruits contain these elements only at certain stages of maturity and when outside of these stages of maturity, the element lacking must be replaced by fruit containing such element. For example, certain species of guavas in the early stage of ripening contain all of the elements for making a complete jelly (except sugar) but when these fruits reach the full stage of ripeness they are lacking in acid, and acid of another fruit must be added in order to hydrolyze the pectin so that the jelly can be made. In order to fully explain the meaning of this and the necessity for having acid consider the following: Pectin is a soluble or semi-soluble colloid cellulose, which, when heated with certain acids and water, becomes hydrolyzed, that is the compound takes up a part of water. This phenomena is apparent by the cooking of vegetable matter in citric acid solution, showing the tendency to become transparent or clarified.

When the hydrolyzed substances is cooked and sugar added, the sugar, having an affinity for water, is taken up in the hydrolyzed pectin or pectic acid, and where the proportions are properly made, will solidify when boiled down to 107 degrees centigrade, forming a jelly. It is therefore necessary that these elements be present in proper proportion in order to make the jelly. For example, in the manufacture of a dried fruit product for the manufacture of cherry jelly, the following would be the process: Sour cherries contain sufficient acid for jellying, but not sufficient pectin, and orange pectin is prepared as follows: The orange is peeled very fine, enough to cut out the oil cells, the juice extracted and the resultant white pulp is passed through a food chopper. It is then mixed with the fresh sour cherries, pitted or unpitted, or with cherry juice, and the mass, after being thoroughly worked, is then put into a standard commercial drier or in the sun, preferably the commercial drier, where it is dried by passing air through the substance at a temperature between 112 and 156 degrees Fahrenheit, the mass being stirred at intervals.

It is not possible to give the exact proportions in which the orange and cherry are mixed, because of the fact that as the season advances both fruits undergo changes in composition and each individual batch must be tested. Further, it is found that from the dry material there is a certain disintegration or evaporation of the fruit acid even though the packages are moisture proof, and it is therefore necessary to see that there is an excess of acid beyond the final requirement. An excess of acid has been found not to be harmful to the palatability or constituency of the product.

The same method is followed in making a dry product from sweet cherries except that they do not have sufficient acid in themselves and tartaric, citric, malic or phosphoric acid, or fruit juices containing such acids, must be added in order that the pectin in the sweet orange pulp used with the cherries, will become hydrolyzed. The sweet oranges are used for pectin because of the fact that the pulp of the sweet orange contains a large amount of pectin and that it adds no noticeable flavor or color to any fruit with which, for the above reasons, it may be combined.

The housewife or jelly maker can take the dry product as last above described, and cook the material for five minutes, using one pint of water to an ounce of the dry material, then after cooking add another pint of water to each ounce of dry material used and allow it to stand for twelve hours. By then cooking for ten minutes and straining off the juice and adding a pound of sugar to each pint of juice and cooking the same to a jelly test, cherry jelly is completed. For making a cherry jam the same operation is followed except that the pulp is cooked with the juice. This same method is followed for the following other fruits, using the fruit named in identically the same way as the cherry; strawberry, raspberry, logan-berry, plum, grape, pineapple, lemon, grape-fruit, roselle, peach, apricot, currant and similar fruits of these classes, except that in some cases it becomes necessary to add a fruit containing an acid or a fruit juice containing an acid or an acid by itself in order to complement the acid in the fruit named for hydrolyzing the pectin in the sweet orange pulp. In a like manner dried fruit products for jelly making are made by adding an acid to a fruit containing sufficient pectin as in the case of guavas, wherein the guava has sufficient pectin but not sufficient acid. Lemon juice, sour orange juice, lime juice, or other acid fruit juice or other acid must be added and the mixture dried as described above and used in the same manner for making jelly as described above. This same process will apply to the apple which contains sufficient pectin, but not sufficient acid and it is to be understood that in the several references I have made, and will make, to fruit, fruit juices are contemplated as well as the whole fruit, under this term.

Some fruits that contain these elements such as roselle, may have the parts of the fruits or parts of the plants containing jelly making properties comminuted by grinding, chopping or slicing, and then dried, or by drying the entire fruit, either of which processes renders the roselle suitable for making complete jelly by the addition of sugar and water in cooking, as outlined above.

I claim:—

1. A food product consisting of the dried mixture of portions of fruit containing sufficient acid for making jams, jellies, and the like, and insufficient pectin, together with portions of other fruits containing sufficient pectin.

2. A food product consisting of the dried mixture of the components of a fruit containing sufficient acid, for making jams, jellies and marmalades, and insufficient pectin together with a fruit containing sufficient pectin and another fruit containing a flavor and insufficient acid and pectin, the whole combined in quantity and proportion adapting the same for utilization in making jams, jellies and marmalades.

3. A food product consisting of the dried mixture of the components of a fruit or fruit juice containing pectin, and insufficient acid with an acid in quantity and proportion adapting the same for utilization in making jams, jellies and marmalades.

4. A food product consisting of the dried mixture of the components of a fruit containing pectin and insufficient acid together with a fruit containing a flavor, and insufficient acid and insufficient pectin, with an acid in quantity and proportion adapting the same for utilization in making jams, jellies and marmalades.

5. The process of forming a pure fruit jelly, jam and marmalade making product, which consists in separating fruits and selecting the jellying components thereof in the natural organic state, recombining the components so selected and in then drying the recombined components, whereby jellies, jams and marmalades may be completed by cooking with the simple addition of water and sugar.

REX DE ORE McDILL.